United States Patent [19]

Smith

[11] 4,452,829

[45] Jun. 5, 1984

[54] SPRAYABLE, CROSS-LINKED TRIMER POLYMER AND METHOD OF USE AND PREPARATION

[75] Inventor: Stuart B. Smith, Conyers, Ga.

[73] Assignee: Thermocell Development, Ltd., Knoxville, Tenn.

[21] Appl. No.: 505,793

[22] Filed: Jun. 20, 1983

[51] Int. Cl.$^3$ .................. C08G 18/14; C08G 18/20; B05D 1/00; B05D 1/05

[52] U.S. Cl. ........................ 427/209; 521/128; 521/902; 427/244; 427/421; 428/308.4; 428/422.8; 428/423.1; 428/423.3

[58] Field of Search .............. 521/128, 902; 427/209, 427/244, 421

[56] References Cited

U.S. PATENT DOCUMENTS 3,268,553 8/1966 Paquette .................. 521/128
4,041,019 8/1977 McGraw et al. ............ 521/128
4,134,994 1/1979 Bechara et al. ............ 521/128
4,165,412 8/1979 Bechara et al. ............ 521/128
4,189,541 2/1980 Ohashi et al. .............. 521/902
4,189,543 2/1980 Doorakian et al. .......... 521/128

OTHER PUBLICATIONS

DBU Salt Urethane Catalyst–San Abbott Ltd. (Tokyo), Data Sheet, No. 8-334, 17 pp., Jan. 1980.

*Primary Examiner*—H. S. Cockeram
*Attorney, Agent, or Firm*—Richard P. Crowley

[57] ABSTRACT

A sprayable polyisocyanurate composition, which composition is prepared by reacting equal parts of an A side mixture, containing a low-functionality methylene diisocyanate, with a B side mixture which comprises diethylene glycol, a low-hydroxyl polyether triol, a trimerization catalyst and a heat-activated catalyst, to provide a cure time of less than about 30 seconds.

23 Claims, No Drawings

SPRAYABLE, CROSS-LINKED TRIMER POLYMER AND METHOD OF USE AND PREPARATION

BACKGROUND OF THE INVENTION

In the past, rubbery, elastomeric-type polymers have been prepared by the reaction of an isocyanate with a diol or triol compound in the presence typically of a tin catalyst and an amine-type (Dabco) catalyst combination. The elastomeric polymer so produced generally contains mostly urethane linkages and is not fully cross-linked, and as such it tends to melt at relatively low temperatures; for example, under 180° F. The cure time of the polymers often extends to 20 to 30 minutes, and, while the ingredients may be premixed and reacted for some applications, they clearly are not suitable for use in sprayable-type applications, wherein the ingredients are sprayed onto a surface substrate as a coating or sprayed into foam form.

SUMMARY OF THE INVENTION

The invention relates to a trimer composition having elastomeric groups therein and to a method of preparing and using the trimer composition. In particular, the invention concerns a sprayable, polyisocyanurate trimer elastomeric composition suitable to be sprayed onto a surface and which rapidly creams and cross-links, and which composition may be sprayed or applied as a solid or foam composition and be adjusted easily between a rigid and flexible composition. The trimer compositions of the invention are particularly suitable for use in fixed-volume spray-type equipment, wherein the respective A and B mixtures may be mixed and sprayed in equal-volume ratios, to provide a coating or foam composition.

A high-modulus, elastomeric-type trimer polyisocyanurate composition has been discovered, which trimer composition has cross-liked, elastomeric groups therein, and which trimer composition, by being cross-linked fully and rapidly, does not melt on exposure to high temperatures and open flame, but rather builds up a char and has excellent char resistance, and which composition may be adjustable through the employment of varying amounts of low-hydroxyl-number triols to range from a rigid to a flexible, cured polymer, and which may be applied in solid or foam form, and more particularly sprayed in fixed volume one-to-one spray equipment. The elastomeric trimer compositions of the invention are particularly useful in spraying substrate surfaces, either in solid or foam form, and particularly for spraying vertical or overhead surfaces, where rapid creaming and rapid curing of the composition are required. In one use, the trimer composition may be employed in the preparation of a rigid foam layer, and the same or similar composition without the blowing agent employed as a coating on one or both sides of the foam layer, to provide a unique, rigid-foam-board product having a sealing coating thereon of the same or similar materials. The coated board product provides for a smooth surface on the foam, and yet the product will not delaminate through the difference in thermal expansion between the coating and the foam, since the product is composed of the same materials. Thus, the coating and foam composition are characterized by high melting points, good char resistance, both rapid cream and curing times, and may be applied in spray-type equipment, such as equipment which is not adjustable, but which requires equal volume or one-to-one volumes of the A and B side mixtures of the reactants.

The trimer compositions of the invention comprise an A side mixture containing a majority of a polyisocyanate and particularly a low functionality; that is, less than about 2.4 average functionality, such as from about 2.0 average functionality or less, of MDI, alone or in combination, with minor amounts of a low-hydroxyl-number triol, which A side mixture is usually free of catalysts. The B side mixture comprises the combination of a diol, typically a diethylene diol, and a low-hydroxyl-number triol, with the majority of the B mix being a triol, to reduce the average hydroxyl number of the triol/diol B mixture to 300 or less; for example, less than 200. The amount of the triol employed, either in the A or B mixture, may be varied, in order to control the stiffness or rigidity of the resulting cross-linked product, with more triol being added, resulting in the additional elastomeric groups between the trimer groups, to provide for more flexibility, with lower amounts of triol providing for a more rigid-type cross-linked composition. For example, polyether triols having a low hydroxyl number; for example, less than 50 and typically about 30 or less, and molecular weights of 1000 to 6000, are useful in the invention, together with diethylene glycol in low amounts, which have a hydroxyl number of approximately 1100. All of the triols may be placed in the B side, or in some formulations the triol may be admixed with the MDI and added to the A side, to provide for additional triol in the overall reaction mixture, thereby providing for a more flexible or elastomeric-type trimer material having elastomeric properties, but rapidly and fully cross-linked and with high char resistance and a high melting point. The B-side diol/triol mixture also includes catalysts which will effect the rapid trimerization of the low-functionality MDI at a low temperature, to cause an exothermic reaction, so that, as the reaction proceeds, further catalysts, such as heat-activator-type catalysts at about 140° F. to 160° F., are activated to promote the triol urethane elastomeric linkages between the trimer regions, thereby providing a fully cross-linked, rapidly cured, high-modulus trimer composition. Typically, the B side mixture comprises a low-activated trimerization catalyst, such as a potassium salt, particularly a potassium fatty-acid salt like potassium octoate, to effect the immediate or rapid trimerization of the low-function MDI, on mixing of the A and B mixtures, and a rapid exotherm to 120° F. or above in generally les than 10 to 15 seconds. Where a rapid-acting trimerization catalyst is not employed; for example, if the formulation does not include potassium octoate, then the mixture of the MDI and the diol/triol in the presence of other urethane-type catalysts only provides a very slow and unsatisfactory cure, and such a formulation cannot be sprayed, particularly on vertical or overhead walls, where fast creaming and instant cross-linking are desirable to retain the material in place after spraying.

Typically, the B side mixture also includes a heat-activated or a urethane-type catalyst, so that, after initial trimerization, the elastomeric groups of the triol may be secured to the trimer. The heat-activated catalyst is not effected, until a substantial or major part of the trimerization reaction has occurred. Such heat-activated catalysts are typically amine-type catalysts and in particular may comprise a heat-activated phenol acid-blocked salt, such as a diazobicycloundec-5,-ene phenol-blocked salt which is heat-activated at about 160° F. or above. Generally, the heat-activated catalyst is also employed in combination with a urethane-type catalyst, such as a metal catalyst like a tetravalent tin catalyst of a tetravalent tin fatty-acid salt. While the employment of the tin urethane-type catalyst is optional, it has been found that the tin catalyst tends to come into operation at about 150° F. to 160° F. at about the same time as the heat-activated acid phenol catalyst. The amount and nature of the catalyst may vary, depending upon the degree of cream time and rapidity of the cross-linking desired, but typically it is desired to obtain a substantially instantaneous cream time, after mixing and starting of the reaction, if less than about 5 seconds, such as less than 3 seconds, and with the cross-linking occurring during the exothermic reaction in generally less than 20 seconds, or typically from about 5 to 12 seconds. The resulting cured trimer elastomeric product should not melt and, on exposure to open frame, merely chars. The B side mixture may also contain minor and low amounts of other materials, such as stabilizers like an ethanolamine, blowing agents, surfactants, modifiers and other additives.

The spraying in fixed-volume quantities of about 100 parts by volume of the A side mixture of low-functionally MDI with 100 parts by volume of the B side mixture containing the triol/diol catalyst mixture provides for sprayed, solid, typical coating compositions, the flexibility and rigidity of which are governed by the amount of triol and MDI, and more flexible where the additional triol has been added to the A side mixture with the MDI. However, it is often desired to provide for a foamable spray composition, and, in such cases, the B side mixture should include a blowing amount of a blowing agent, typically a halocarbon, such as chlorofluoro methane or ethane, and a surfactant, such as a silicone surfactant, to provide for controlled cell size and cell formation, and optionally, where required, additional catalyst. Where equal volumes of the A and B side mixtures are sprayed, the addition of the blowing agent and silicone surfactant has a tendency to cool or slow slightly the reaction, and, therefore, the foamable reaction, particularly if sprayed on a vertical wall, may tend to run, unless the cream time is reduce. Therefore, it has been found often desirable to add a urethane-type catalyst or catalysts, to increase the cream time to less than 5 seconds or substantially instantaneously. It has been found that a zinc salt catalyst is often effective, and typically a zinc fatty-acid-type catalyst, such as zinc octoate, is employed in an amount sufficient to provide for almost instant creaming, after admixing of the A and B side mixtures. This addition permits the foamable spray composition to set immediately on a vertical wall or overhead wall, and, therefore, to permit rapid cross-linking to take place. The employment of the zinc catalyst or other catalyst, to enhance cream time, sometimes leads to some slight delays in the curing cycle; however, even with the optional use of such zinc catalyst, the curing cycles are substantially fast; for example, less than 30 seconds and typically less than 10 seconds.

Although not wishing to be bound by any particular theory and method of operation, composition or structure, it is believed that the trimer composition of the invention comprises trimerized MDI, with elastomeric groups extending between the trimerized MDI, with the elastomeric groups being formed primarily by the triols somewhat like the spokes of a wheel, with the trimerized portion being at the hub of the wheel.

Thus, employing a trimer composition which includes a blowing agent, a generally high-density-type closed-cell, cross-linked foam having about 3-to-12-pound, and more typically 6-to-9-pound density, may be formed, and, thereafter, by the removal of the blowing agent and the silicone surfactant, the same or a similar formulation, with triol variations, then may be sprayed, coated or otherwise applied onto one or typically both surfaces of the rigid foam, to provide a solid, sealing, coating layer over both surfaces of the foam, thereby producing a rigid foam which will not delaminate, when exposed to variations in temperature, and has no visibly observed lines of separation between the solid coating and the foam, permitting the material to be employed as a modular panel for roofing or building construction. While the trimer compositions are adapted to be sprayed, it is recognized that such compositions can be applied and used in variable and fixed spray equipment and applied and used by a variety of casting, molding, coating and layering techniques. A typical formulation of the trimer composition, subject to be used in fixed-volume spray equipment, would be as shown in Table I.

TABLE I

Typical Formulations

| | | PARTS BY WEIGHT | |
|---|---|---|---|
| | | Range | Preferred Range |
| A side (volume is 100) | | | |
| 1. | MDI low functionality >2.4; e.g., 2.0 | 100–60 | 30–0 |
| 2. | Polyether triol hydroxyl number >50; e.g., 30 MN 1000–6000; e.g., 1500–5000 | 40–0 | 30–0 |
| B side (volume is 100) | | | |
| 1. | Diethylene glycol (DEG) | 5–40 | 20–30 |
| 2. | Polyether triol (as above) | 50–90 | 60–80 |
| 3. | Blowing agent fluorocarbon (optional) | 1–15 | 3–10 |
| 4. | Trimer catalyst (reaction mixture) potassium octoate | 0.1–5 | 0.2–2.0 |
| 5. | Heat-activated catalyst (reacts above 140° F.) phenol amine salt | 0.01–2.0 | 0.05–0.5 |
| 6. | Cream-time catalyst (to reduce cream time 15 secs. or less) tetravalent tin salt Sn octoate (optional) | 0.01–2.0 | 0.05–0.5 |
| 7. | Surfactant silicone (optional) | 0.1–3.0 | 0.3–1.0 |

Reaction time on mixing - 5 seconds or less.
Cure time - 20 seconds or less; e.g., 10 or less.
Cream time - 15 seconds or less; e.g., 10 or less.
Sprayed at equal volumes A and B.

The reaction mixtures of the invention is typically sprayed, to produce a solid or foam coating on a variety of substrates. The liquid formulation may be sprayed onto rigid polyurethane, polystyrene or polyisocyanurate foams used typically as insulation, roofing materials or other substrate-type material, such as onto glass fibers or polyester woven or nonwoven substrates, as well as directly onto paper, metal, such as aluminum foil, and the like. The cured coating composition exhibits good fire properties, in that it chars and does not melt, which provides for fire-insulating properties. The degree of rigidity or flexibility of the solid or foam coating can be controlled as described, by varying the amount of the triol and the catalyst compositions. Typically, the coating, when employed as a coating, produces a smooth, washable, surface skin, while, as a foam, it produces a fine, uniform, closed-cell foam. In one method of insulation, the compositions A and B are premixed together in an equal-volume spray nozzle directly at room temperatures, so that an exothermic curing reaction occurs, typically within 5 seconds or instantaneously, on mixing. It may be desirable in some cases to preheat the substrate surface prior to the application of the reaction mixture, and particularly if a very thin, cured, solid coating is desired immediately on the substrate. The coating composition may be applied for various thicknesses; for example, 1/16th to ⅜ths of an inch thickness, on rigid insulation-type foam used as insulation and roofing materials. The sprayable composition of the invention is useful particularly for spraying a coating directly on asbestos-containing materials, to seal the asbestos-containing substrate materials.

In one preferred embodiment, a rigid foam board is produced employing a blowable composition of the invention to the desired thickness, for use as a roofing panel or a side-wall panel for industrial purposes, and, thereafter, one or both foam surfaces sprayed with the same formulation, except without the silicone surfactant, blowing agent and without the cream-type catalyst, to form a thin, smooth coating on each side of the foam to seal the foam. This type of a sealed, coated foam board composed of the same composition provides typically for an inner foam layer of ½ of an inch to 3 inches of 6 to 12 pounds per cubic foot closed-cell density, and with a thin coating on either side, and is used for insulation and construction purposes.

The invention will described in connection with certain embodiments and formulations; however, it is recognized that various changes and modifications may be made by those persons skilled in the art, all falling within the spirit and scope of the invention.

DESCRIPTION OF THE EMBODIMENTS

Example

Various formulations are set forth in Table II.

TABLE II

| | Formulations | | | |
|---|---|---|---|---|
| | 1 | 2 | 3 | 4 |
| | | Code Name | | |
| | R | RF | F | FF |
| Ingredients | | PARTS BY WEIGHT | | |
| A side (no catalyst present) | | | | |
| 1. MDI low functionality | 100 | 100 | 70 | 70 |
| 2. Polyether triol | | | 30 | 30 |
| B side | | | | |
| 1. Polyether triol diol (DEG) | 75 25 | 75 25 | 75 25 | 75 25 |
| 2. Timer catalyst K octoate | 0.4 | 0.4 | 0.4 | 0.4 |
| 3. Amine stabilizer | 0.4 | 0.4 | 0.4 | 0.4 |
| 4. Heat-activated catalyst SA No. 1 | 0.07 | 0.07 | 0.07 | 0.07 |
| 5. Urethane catalyst UL-29 Sn$^{+4}$ | 0.05 | 0.05 | 0.05 | 0.05 |
| 6. Blowing agent F-11 | | 5.0 | | 5.0 |
| 7. Silicone surfactant L-5422 | | 1.0 | | 1.0 |
| 8. Catalyst Zn octoate (22%) | | 0.4 | | 0.4 |

Reaction times on mixing in fixed equal - volume in Gusmer spray equipment
Cure time - about 10 seconds.
Cream times - about 5 seconds or less.
1. MDI methylene-bis diphenylisocyanate - Mondur CD from Monsanto Company
2. Polyether triol - Olin 32-56, Olin Corporation, MW 3000
3. Triethanolamine
4. SA-No. 1 - heat-activated acid-blocked dbu phenol salt, San-Abbott Limited, sold as catalyst for urea-formaldehyde particle boards
5. UL-29 - Witco Chemical Co.
6. Trichloro fluoro methane - Freon 11
7. L-5422 - silicone surfactant, Union Carbide Corp. or DC-197 - Dow Chemical Co.
8. UL-32 - Witco Chemical Co.

Formulation R provided a rigid, dense, solid coating (72 pounds per cubic foot), when sprayed onto a substrate. Formulation RF provided a high-density, rigid, closed-cell foam (6-9 pounds per cubic foot). In view of the cooling effect of the blowing agent, which reduces cream time, a zinc catalyst was added to reduce cream time. Formulations F and FF contained larger amounts of triol, with some of the triol in the A side formulation, so as to provide for a more flexible; that is, rubbery-type, solid coating (F) and a more flexible, closed-cell foam (FF). The combination of ingredients permitted the formulation to be sprayed, using Gusmer spray equipment, directly onto vertical walls and ceilings for coating such walls and ceilings and onto coating F to be sprayed onto the surface of foam RF, to form a rigid insulation board.

What is claimed is:

1. A process of preparing a sprayable polyisocyanurate composition, which composition is prepared by mixing and reacting together substantially equal volumes of an A side mixture and a B side mixture, the A side mixture comprising 60 to 100 parts of a MDI having an average functionality of less than about 2.4 and 0 to 40 parts of a polyether triol having a molecular weight of from about 1000 to 6000 and a hydroxyl number of less than about 50, and the B side mixture comprising from about 5 to 40 parts of diethylene glycol, about 50 to 90 parts of a polyether triol having a molecular weight of from 1000 to 6000 and a hydroxyl number of about 50 or less, a catalytic amount of a trimerization catalyst to provide for the rapid exothermic trimerization reaction of the A and B mixtures on mixing, and a catalytic amount of a heat-activated catalyst activated at about 140° F., to provide, on mixing and reacting, a composition which reacts within about 5 seconds, creams within 10 seconds and is substantially cured within 30 seconds.

2. The process of claim 1 wherein the MDI has an average functionality of about 2.0 or less.

3. The process of claim 1 wherein the polyether triol has a hydroxyl number of 30 or less.

4. The process of claim 1 wherein the triol on the B side mixture is present in an amount of from 60 to 80 parts and the diethylene glycol is present in an amount of 20 to 30 parts.

5. The process of claim 1 wherein the trimerization catalyst is a potassium fatty-acid salt.

6. The process of claim 5 wherein the potassium fatty-acid salt is potassium octoate.

7. The process of claim 1 wherein the heat-activated catalyst comprises an acid-blocked phenolic amine salt.

8. The process of claim 7 wherein the phenolic amine salt comprises a diazobicycloundec-5,-ene phenol blocked salt.

9. The process of claim 1 wherein the trimerization catalyst is present in an amount of from about 0.1 to 5 parts.

10. The process of claim 1 wherein the heat-activated catalyst is present in an amount of from about 0.01 to 2.0 parts.

11. The process of claim 1 which comprises a sprayable, foamable composition which includes a blowing amount of a fluorocarbon blowing agent, a cell-control amount of a surfactant and a tetravalent tin catalyst, to provide a cream time after mixing of less than about 10 seconds.

12. The process of claim 11 which includes spraying the sprayable foamable composition onto a substrate to provide, after spraying and reacting, a cured foam coating layer on a substrate.

13. The process of claim 11 which includes spraying the sprayable polyisocyanurate composition onto the surface of a polyisocyanurate rigid foam material to provide a cured coating on at least one surface of the polyisocyanurate foam material.

14. The process of claim 11 which includes spraying the sprayable polyisocyanurate composition onto a rigid foam board material to provide a cured coating layer on at least one surface thereof.

15. The process of claim 11 which includes spraying substantially equal volumes of A and B side mixtures in fixed-volume spray equipment to provide, on spraying and reacting, a cured polyisocyanurate composition.

16. The process of claim 11 wherein the cream-time catalyst is present in an amount of from about 0.1 to 3.0 parts.

17. The cured composition of claim 1.

18. The cured foam composition of claim 11.

19. The process of claim 1 which includes spraying the sprayable polyisocyanurate composition onto a substrate, to provide a thin, solid, cured, coating layer.

20. A process of preparing a sprayable polyisocyanurate composition, which composition is prepared by mixing and reacting together substantially equal volumes of an A side mixture and a B side mixture, the A side mixture comprising 60 to 100 parts of a MDI having an average functionality of less than about 2.4 and 0 to 40 parts of a polyether triol having a molecular weight of from about 1000 to 6000 and a hydroxyl number of less than about 50, and the B side mixture comprising from 20 to 30 parts of diethylene glycol, 60 to 80 parts of a polyether triol having a molecular weight of from 1000 to 6000 and a hydroxyl number of about 50 or less, a catalytic amount of a potassium octoate trimerization catalyst to provide for the rapid exothermic trimerization reaction of the A and B mixtures on mixing, and a catalytic amount of a heat-activated, diazobicycloundec-5,-ene phenol blocked salt catalyst activated at about 140° F., to provide, on mixing and reacting, a sprayable composition.

21. A process of preparing a sprayable, foamable, polyisocyanurate composition, which composition is prepared by mixing and reacting together substantially equal volumes of an A side mixture and a B side mixture, the A side mixture comprising 60 to 100 parts of a MDI having an average functionality of less than about 2.4 and 0 to 40 parts of a polyether triol having a molecular weight of from about 1000 to 6000 and a hydroxyl number of less than about 50, and the B side mixture comprising from 20 to 30 parts of diethylene glycol, 60 to 80 parts of a polyether triol having a molecular weight of from 1000 to 6000 and a hydroxyl number of about 50 or less, a catalytic amount of a potassium octoate trimerization catalyst, to provide for the rapid exothermic trimerization reaction of the A and B mixtures on mixing, a catalytic amount of a heat-activated diazobicycloundec-5,-ene phenol block salt catalyst activated at about 140° F., a blowing amount of a fluorocarbon blowing agent, a cell-control amount of a surfactant and a tetravalent tin catalyst, to provide, on mixing and reacting, a sprayable composition.

22. The process of claim 21 which includes spraying the sprayable polyisocyanurate composition onto the surface of a rigid foam board material, to form a coating layer on at least one surface thereof.

23. The process of claim 21 wherein the cured foam material comprises a rigid, closed-cell, polyisocyanurate foam material having a density of less than about 12 pounds per cubic foot.

* * * * *